(12) United States Patent
Brown et al.

(10) Patent No.: US 6,880,014 B2
(45) Date of Patent: Apr. 12, 2005

(54) METHOD AND SYSTEM OF USE OF TRANSCODE DIRECTIVES FOR DISTRIBUTED CONTROL OF TRANSCODING SERVERS

(75) Inventors: Frances C. Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 09/961,896

(22) Filed: Sep. 24, 2001

(65) Prior Publication Data

US 2003/0061386 A1 Mar. 27, 2003

(51) Int. Cl.[7] .............................................. G06F 13/00
(52) U.S. Cl. ...................... 709/227; 709/203; 709/217; 709/219; 709/236
(58) Field of Search ................................ 709/200, 201, 709/203, 217, 218–227, 236

(56) References Cited

U.S. PATENT DOCUMENTS

| | | |
|---|---|---|
| 5,940,598 A | 8/1999 | Strauss et al. |
| 5,983,273 A | 11/1999 | White et al. |
| 6,009,103 A | 12/1999 | Woundy |
| 6,038,595 A | 3/2000 | Ortony |
| 6,055,275 A | 4/2000 | Pinier et al. |
| 6,073,168 A | 8/2000 | Mighdoll et al. |
| 6,101,328 A * | 8/2000 | Bakshi et al. ................ 717/170 |
| 6,185,625 B1 * | 2/2001 | Tso et al. .................... 709/247 |

(Continued)

FOREIGN PATENT DOCUMENTS

GB          2 346 238 A          2/2000

OTHER PUBLICATIONS

"4–Tier Check Image Distribution System", Research Disclosure, (May 1999), IBM Corporation, Pgs. 722–724.
Network Working Group, Rfc 2616.

(Continued)

Primary Examiner—Moustafa M. Meky
(74) Attorney, Agent, or Firm—Robert M. Carwell; Dillon & Yudell LLP

(57) ABSTRACT

A method and system using directive script in a web intermediary proxy machine that provides the function of a transcoder. The intermediary machine's transcoders are controlled by directive script that directs the order and properties of transcoder operations executed on one or more transcoders in the intermediary machine. These directive scripts are stored in an on-the-fly modifiable directive database accessible to the web intermediary proxy machine. The user's client machine browser passes an HTTP request to the web intermediary machine, which passes the HTTP request to a web content server, which returns an HTML response back to the web intermediary machine. This HTML response is sent to at least one transcoder that resides in or is at least accessible to the intermediary proxy machine. The transcoder identifies the type of device being used by the client from the HTTP request. The user's preference transcoding settings are retrieved in the form of directives from a directive script, preferably in XML format, retrieved from a settings database, and applied to the transcoders. The tailored transcoded response is then sent back to the user's client machine.

21 Claims, 3 Drawing Sheets

U.S. PATENT DOCUMENTS

| | | | |
|---|---|---|---|
| 6,199,144 B1 | | 3/2001 | White et al. |
| 6,247,048 B1 | * | 6/2001 | Greer et al. ................. 709/219 |
| 6,304,904 B1 | * | 10/2001 | Sathyanarayan et al. .... 709/224 |
| 6,311,215 B1 | * | 10/2001 | Bakshi et al. ................ 709/221 |
| 6,345,300 B1 | * | 2/2002 | Bakshi et al. ................ 709/229 |
| 6,345,303 B1 | * | 2/2002 | Knauerhase et al. ........ 709/238 |
| 6,421,733 B1 | * | 7/2002 | Tso et al. .................... 709/246 |
| 6,611,358 B1 | * | 8/2003 | Narayanaswamy ......... 358/442 |
| 6,662,218 B2 | * | 12/2003 | Mighdoll et al. ............ 709/219 |
| 6,704,024 B2 | * | 3/2004 | Robotham et al. .......... 345/581 |
| 6,772,200 B1 | * | 8/2004 | Bakshi et al. ................ 709/217 |

OTHER PUBLICATIONS

"A Process for Optimized Application of Xsl Stylesheets for Use with Partially Static Xml Data Streams", Research Disclosure, (April 2000), IBM Corporation, Pgs. 784–785.

* cited by examiner

1

METHOD AND SYSTEM OF USE OF TRANSCODE DIRECTIVES FOR DISTRIBUTED CONTROL OF TRANSCODING SERVERS

BACKGROUND OF THE INVENTION

1. Technical Field

The present invention relates in general to the field of computer networks, and, in particular, to the connection between a user device and a content server. Still more particularly, the present invention relates to an improved method and system for controlling transcoding operations through the use of directives through a data formatting system using a directive script.

2. Description of the Related Art

The Internet is a worldwide decentralized network of computers having the ability to communicate with each other. The Internet has gained broad recognition as a viable medium for communicating and interacting across multiple networks. The World Wide Web (WWW) was created in the early 1990's and is comprised of server-hosting computers (web servers) in which HyperText documents (referred to as web pages) are typically stored. Web pages are accessible by client programs (e.g., web browsers) with the HyperText Transfer Protocol (HTTP) via a Transmission Control Protocol/Internet Protocol (TCP/IP) connection between the user's client device and a content web server. While HTTP documents are the prevalent forms for the web, the web itself refers to a wide range of protocols including Secure HyperText Transfer Protocol (S-HTTP), File Transfer Protocol (FTP), and content formats including plain text, eXtensible Markup Language (XML), as well as image formats such as the Graphics Interchange Format (GIF) and Joint Photographic Expert's Group (JPEG).

Web browsers typically provide a Graphical User Interface (GUI) for retrieving and viewing web pages, applications, and other resources hosted by Internet servers (web servers). As is known to those skilled in this art, a web page is conventionally formatted via a standard page description language such as HyperText Markup Language (HTML), which typically contains text and can reference graphics, sound, animation and video data. HTML provides for basic document formatting and allows a web content provider to specify anchors or HyperText links (typically manifested as highlighted text) to other web servers and files. When a user selects a particular HyperText link, a web browser reads and interprets an address call to a Uniform Resource Locator (URL) associated with the link, connects the web browser with a web server at that address, and makes a request (e.g., an HTTP request) for the file identified in the link. The web server then sends the requested file to the web client which the web browser interprets and displays to the user.

With the increasing mobility of today's society, the demand for mobile computing capabilities has also increased. Many workers and professionals are downsizing their laptop computers to smaller palmtop or handheld devices, such as Personal Digital Assistants (PDA's). In addition, many people are utilizing cellular telephones to access the Internet. Computing devices including, but not limited to, PDA's, cellular telephones, and like computing devices are often collectively referred to as "pervasive" computing devices. Typically, pervasive computing devices have displays that are small in size compared to desktop computer displays. As a result, content portions of a web page, such as images and text that are otherwise displayable on the desktop computer display, may not be displayable on a pervasive computing device display unless some modifications to the images and/or text (i.e., the content) are made. For example, a desktop computer display having array of 1,024 pixels by 768 pixels may be able to display a large (e.g., 2-megabit) 24-bit per pixel color image. A pervasive computing device with a smaller display having an array of only 120 pixels by 120 pixels, and with the ability to display only about 3-bits per pixel, may ignore much of the image data. As a result, the image may not be displayed properly, if at all, via the pervasive computing device display unless the displayed content is reduced. Text font and size within the web page may also need to be changed to permit the readable display on a pervasive computing device display. In addition, performance limitations of pervasive computing devices, such as memory, size and connection bandwidth, may also require changes to web page content for proper display.

Accordingly, it is necessary to have techniques that permit web page content to be modified and presented in custom tailored formats for one or more users on various types of pervasive computing devices. This modification is known as "transcoding," and is performed by software engines known in the art as "transcoders." As described above, transcoding may include removing or shrinking of images. Transcoding may also include the creation of summary pages of headings, or in some cases, conversions of HTML to dialects such as Compressed Markup Language (CML), Wireless Markup Language (WML), Handheld Device Markup Language (HDML) and iMode. Transcoding is also defined broadly as any transformation of web page content from one form to another, such as changing font size, display type (visual, aural, etc.), or even underlying descriptors such as user identification name, pathways, file descriptors, etc.

In the prior art, transcoders are set up to have a fixed transcoding scheme for a given device type. The problem with this mechanism is that different transcoders may be required to produce different results for each given user, as each given user may have his own specified options, such as font size, display color, inclusion or exclusion of graphics, etc. If these specifications are changed within the transcoder, the transcoder needs to be re-booted to include the updated specifications. Furthermore, if more than one transcoding machine is used to handled load balancing, more than one machine may need to be re-booted to include the updated specifications.

It should therefore be apparent that there exists a need for a method that will allow for distributed transcoding directives, unique for each given user, which may be applied to control different transcoders. Further, it would be desirable to devise a system, preferably including an intermediary proxy machine having the ability to control different transcoders using user-defined directives. In addition, it would also be desirable to devise a computer program product wherein such a method may be performed on a computer system.

SUMMARY OF THE INVENTION

The present invention is a method and system using directive script in a web intermediary proxy machine that provides the function of a transcoder. The intermediary machine's transcoders are controlled by directive script that directs the order and properties of transcoder operations executed on one or more transcoders in the intermediary machine. These directive scripts are stored in an on-the-fly modifiable directive database accessible to the web intermediary proxy machine. The user's client machine browser passes an HTTP request to the web intermediary machine, which passes the HTTP request to a web content server, which returns an HTML response back to the web intermediary machine. This HTML response is sent to at least one transcoder that resides in or is at least accessible to the intermediary proxy machine. The transcoder identifies the type of device being used by the client from the HTTP request. The user's preference transcoding settings are retrieved in the form of directives from a directive script, preferably in XML format, retrieved from a settings database, and applied to the transcoders. The tailored transcoded response is then sent back to the user's client machine.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
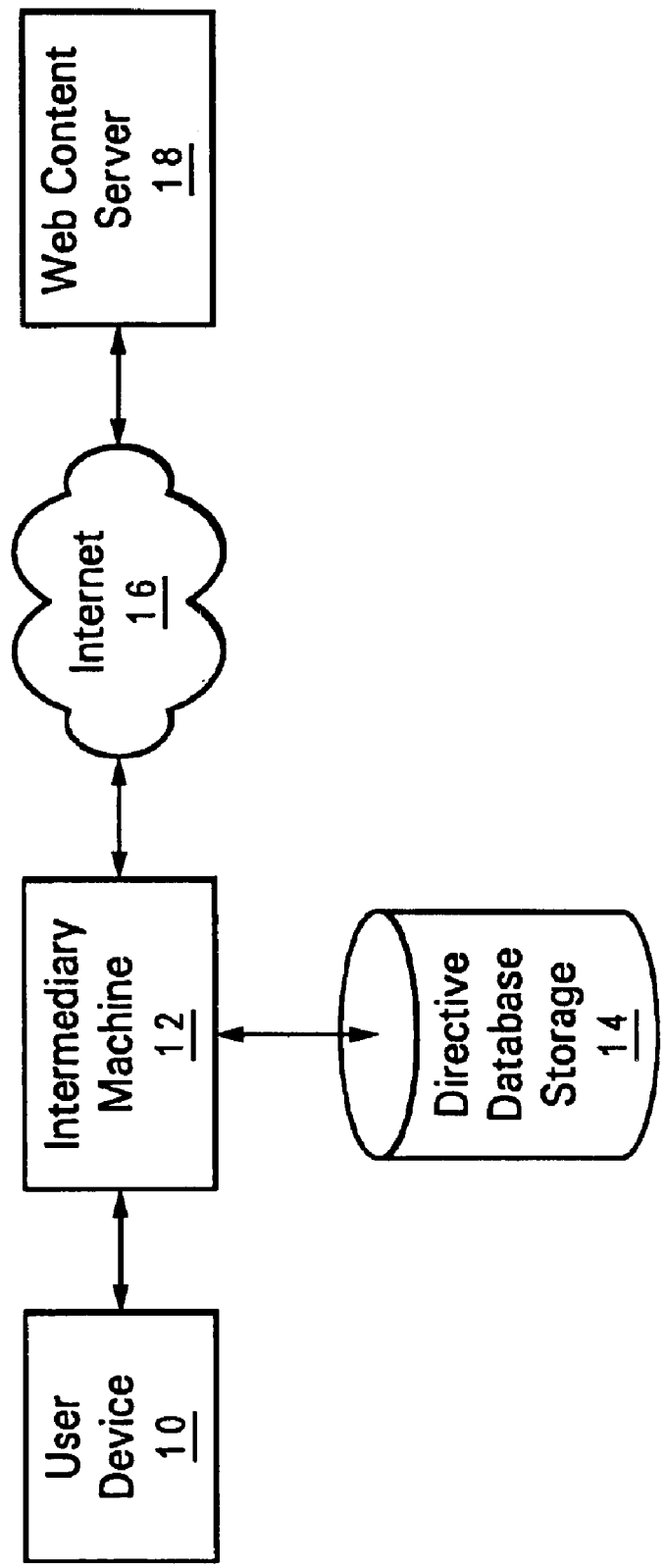
FIG. 1 depicts a hardware block diagram of an Internet connection using an intermediary machine.

With reference now to the figures and in particular with reference to FIG. 1, there is depicted a hardware block diagram of an Internet connection between a user device 10 and content web server 18. User device 10 may be any Internet connectable device, including a desktop computer, laptop computer, Internet appliance, set top box, PDA, computer kiosk, cellular telephone, or similar devices. User device 10 is connected, typically through a computer network or preferably through an Internet, to an intermediary machine 12. Functionally connected to intermediary machine 12 is a directive database storage 14, which is typically a secondary storage device such as a disk drive. Directive database storage 14 stores directive database 30, whose function is described below. Intermediary machine 12 is functionally connected to Internet 16, typically through an Internet Service Provider (ISP), not shown in FIG. 1. Internet 16 comprises a network of computer devices as described above, and is functionally connected to web content server 18, which provides content from a web page.

Figure 2:
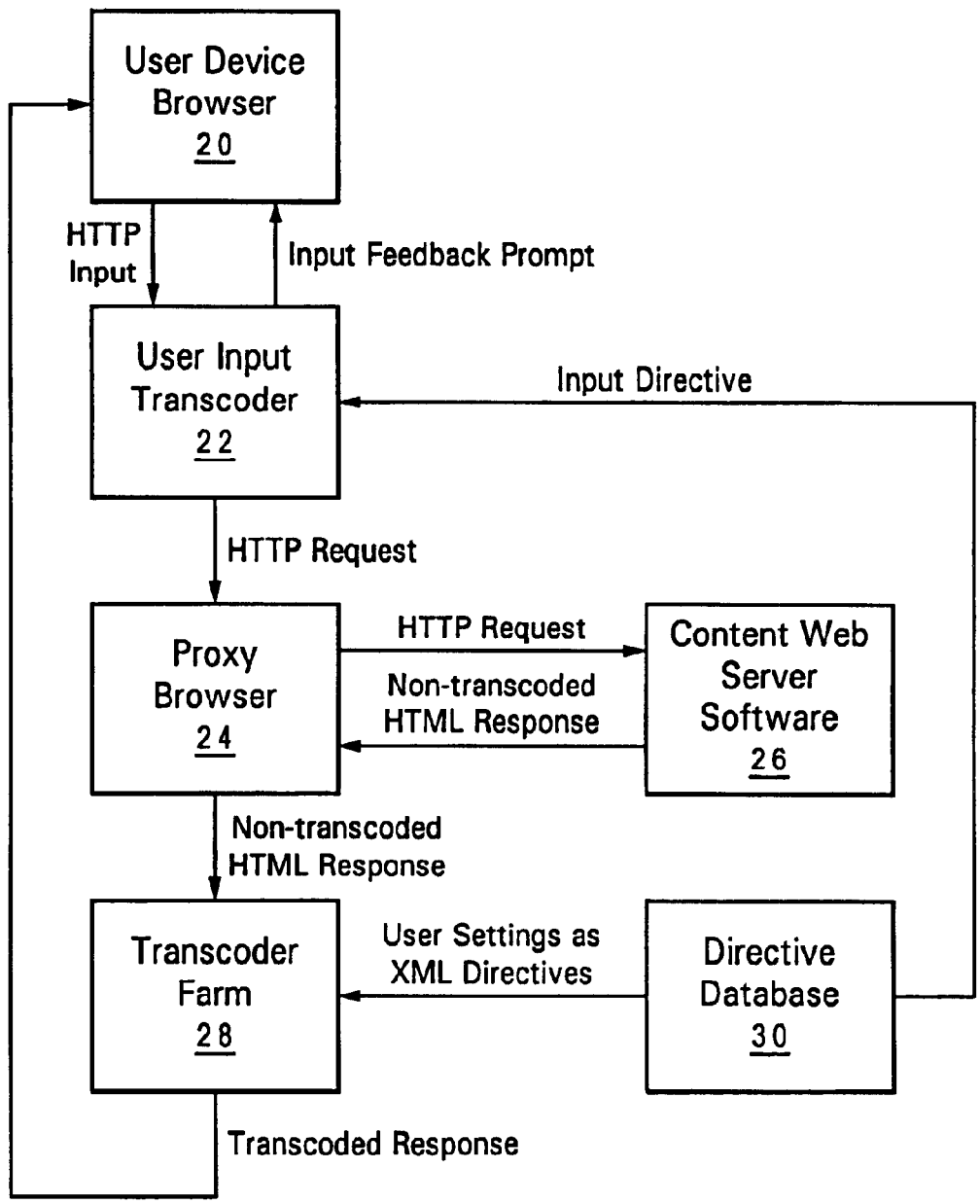
FIG. 2 depicts a block diagram of software used in the directed transcoding of web page content.

Accessing content from web content server 18 according to the present invention is generally performed as depicted in the software block diagram of FIG. 2. User device browser 20, which is associated with user device 10, sends a HyperText Transfer Protocol (HTTP) input to user input transcoder 22. User input transcoder 22 is a transcoder, or preferably a bank or farm of transcoders, typically resident in or at least accessible to intermediary machine 12, that is capable of transcoding an HTTP input that has been mis-entered. For example, if the user has a physical handicap that causes him to hold down a key too long, the auto-repeat function on the keyboard will cause the input of erroneous multiple strikes of a single key. By knowing this trait of the user's typing disability, user input transcoder 22 can correct these typing errors, with or without a user feedback prompt, using input directives from directive database 30 that are defined for that specific handicapped user. In the preferred embodiment, these directives are a directive script, or list of commands executable without user interaction, that direct the order and properties of input transcoder 22. The user feedback prompt is preferably in the form of a web page sent back to the user, showing what was typed by the user and asking for approval to substitute the suggested correction shown on the same web page.

The HTTP request from the user, corrected by user input transcoder 22 if necessary, is then sent to a proxy browser 24 associated with intermediary machine 12. The HTTP request is sent to web content server 18, which includes content web server software 26. A data response, typically as an HTML response, is returned by a content web server software 26 to proxy browser 24 in intermediary machine 12 in a non-transcoded format. The non-transcoded HTML response is then sent to a transcoder in a transcoder farm 28 associated with intermediary machine 12. While proxy browser 24 and transcoder farm 28 are shown as separate blocks, in the preferred embodiment they function within the same device. The transcoding function of the transcoders in transcoder farm 28 is controlled by directives, preferably as directive script preferably in XML format, received from a directive database 30 in directive database storage 14. The XML directive script shown in FIG. 2 going from directive database 30 to transcoder farm 28 are typically applied as a leading header to an HTTP header. The XML directive script defines transcoding directives for each specific user. The XML transcoding directive script tells the bank of transcoders which specific transcoders to run, in what order, and what property preferences each transcoder should use to perform the transcoding operation.

The specific transcoders to be run typically have unique functions, such as summarizing, translating, and converting content for a specific device, such as a PDA or other pervasive device, transcoding HTML content to a WML format, setting formats, sizing fonts, etc. according to predetermined settings.

The order of transcodings run is typically dependent on the website being transcoded as well as the type of client device. Thus, sections of a web page for graphics may be transcoded (or even deleted) first, headings transcoded second, and text information transcoded last, all depending on the settings of the transcoder as directed by directive database 30.

The property preferences each transcoder uses may include user preferences such as font sizes, display arrangement, customized control buttons, and other transcodings. For example, if a user has low vision and needs content to be magnified, an XML directive will assign the appropriate values into the HTTP header to appropriately amend the HTML response. If the user has a transmissive disorder (blurring of content read due to light scattering) a different set of transcoding operations would be performed based on a different transcoding directive from directive database 30. This XML transcoding directive will be specific for the user, but may be used on any device used by the client. Besides manipulating user preferences for accessibility, user preferences for application services such as a history list, bookmarks, browser-based mail, and similar programs may be directed by the XML directive being imported from the directive database. These settings may be established either by directives from directive database 30 to the transcoder, or the directive itself, typically in XML format, may contain an embedded collection of transcoding applications based on the user's device.

Once the transcoding operations are performed, the transcoded response is returned to user device browser 20 from intermediary machine 12.

Figure 3:
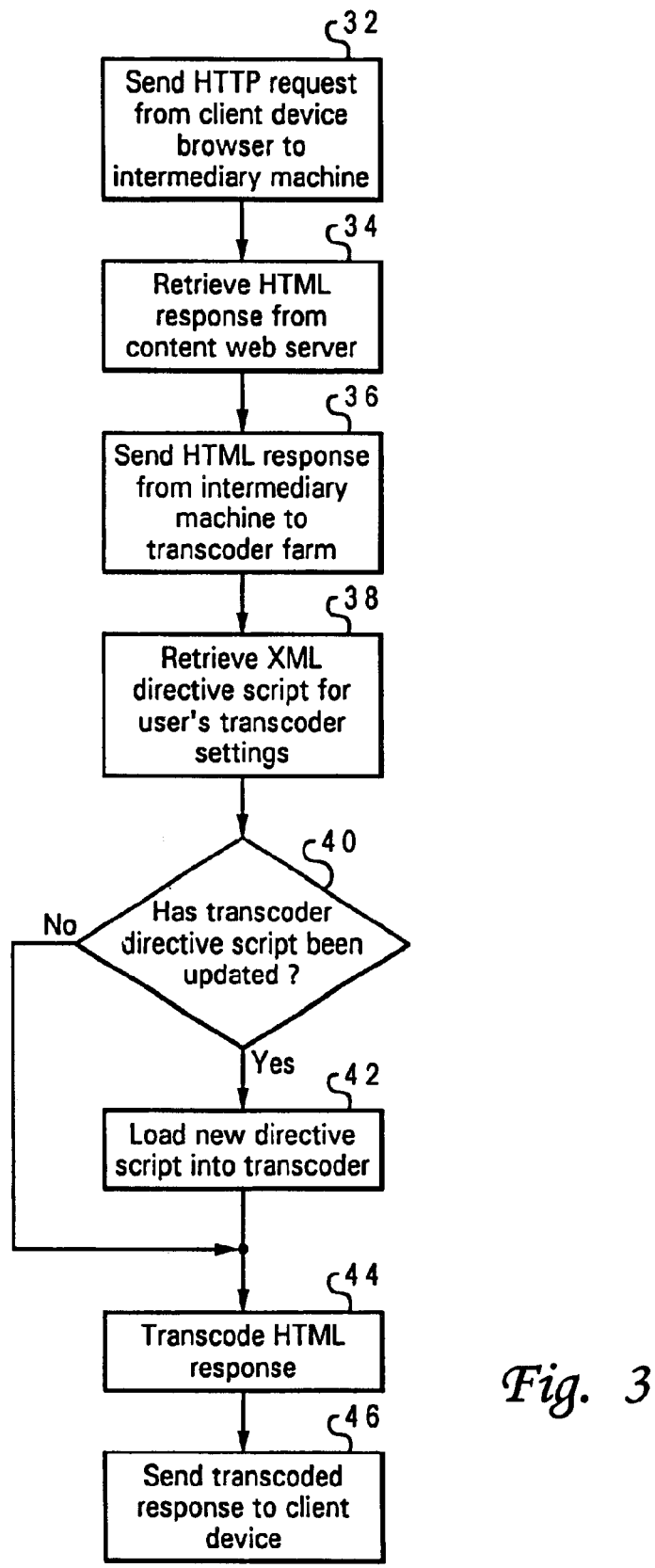
FIG. 3 illustrates a high-level logic flow chart that depicts the use of directives for controlling transcoders.

Referring now to FIG. 3 describing the process of a preferred embodiment of the invention, an HTTP request is sent by a specific user from user/client device browser 20 to intermediary machine 12, as illustrated in block 32. As depicted in block 34, intermediary machine 12 retrieves an HTML response from content web server 18. The HTML response is sent to a transcoder in transcoder farm 28, as illustrated in block 36. Transcoding directive script, preferably formatted in XML, is retrieved from directive database 30 as illustrated in block 38. As shown in block 40, a query is made as to whether the transcoding directive script has been updated since last used. Transcoder directive scripts can be time stamped and queried. If they have changed since their last use, the transcoder directive scripts are loaded into the transcoder, where they are parsed, validated, and cached for transcoding operations, as depicted in block 42. The transcoding directive script can be used to select from a range of transcoders in transcoder farm 28, configure the transcoders, and run them in the desired order specified by the XML transcode directive script. The XML directive script identifies the set of transcode operations based on both device type and content type. That is, the directive scripts may control the transcoder according to the user device for which the transcoding is being performed, and may also apply user preferences such as accessibility transforms as discussed above, all depicted in block 44. As illustrated in block 46, the transcoded response is then sent from intermediary machine 12 to the user device browser 20 associated with user device 10.

Besides transcoding the content of the web page for recognition and acceptance by a pervasive computing device or other user device 10, web page content may be modified according to preferences or needs of a specific user. Modification of the web site both for usability by a specific user device, or modification of Web site according to the user's preference, are both referred to as "transcoding." User preference transcoding is typically associated with accessability to accommodate a disability, such as low vision. Such transcoded transforms for a user with low vision may include text magnification, increased spaces between letters in a word, image magnification, sharpening, increased contrast and/or animation removal, as well as page simplification. Control buttons may be modified, including selecting only those buttons desired by the user, and optionally placing them in the display of the user device in a larger or otherwise modified format.

XML directives may be validated by the dynamic tag data identifying the user and user device, ensuring that the appropriate settings for the user and that device are being applied and controlled by the XML directive script to the transcoder. In addition, in the preferred embodiment the XML directive scripts are time-stamped to ensure that the most recent directive scripts are employed in the transcoding.

As described herein, the XML directive script allows on-the-fly transcoding, since the transcoder does not need to be re-booted when changes are made to the XML directive scripts. That is, changes are made to the XML directive script in directive database 30, which may amend the order, style, type, or operations of the transcoding. Since these directive scripts may be retrieved by the transcoder while performing transcoding functions, re-booting of the transcoder itself is not necessary.

Further, as many of the user preferences are common to different user devices, they may be in the form of a common XML directive script to different transcoders. For example, the same XML directive script may provide user accessibility by instructing any transcoder in a transcoder farm to magnify the font of an HTML response for any device used by the client, including cellular telephone, PDA, laptop computer, or other network connecting device. The same accessibility transforms may be applied to either like or different user devices.

While the present invention has been described using XML directive scripts, it is understood that any similar type of data formatting system may be used to accomplish the objectives of the present invention.

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed is:

1. A method for manipulating information retrieved from a content server on a computer network, said method comprising:

connecting an intermediary machine between a user device and a web content server;

receiving information from the web content server at the intermediary machine, said intermediary machine having access to a plurality of transcoders and a directive script database;

transcoding in the intermediary machine the received information from the web content server into a transcoded response by at least one of the plurality of transcoders according to at least one directive script from the directive script database, wherein said at least one directive script selectively defines at least one transcoding property of at least one transcoder within the plurality of transcoders;

directing, according to the at least one directive script, which of said at least one transcoder are to be run;

directing, according to the at least one directive script, what order said at least one transcoder are to be run; and sending the transcoded response to the user device.

2. The method of claim 1, wherein said at least one directive script is in eXtensible Markup Language format.

3. The method of claim 1, said at least one directive script having at least one embedded transcoding application.

4. The method of claim 1, further comprising:

sending at least one web page to the user device;

inputting into said at least one web page a user input from the user device, said user input selecting at least one preference setting; and constructing said at least one directive script from said at least one preference setting.

5. The method of claim 4, wherein said at least one web page is sent from the intermediary machine.

6. The method of claim 1, wherein said computer network is an Internet.

7. The method of claim 1, further comprising:
receiving at the intermediary machine a user device input from the user device;
identifying any user device input errors received by the intermediary machine;
transcoding the user device input into a transcoded user device input in the intermediary machine by said at least one of the plurality of transcoders according to said at least one directive script from the directive database, wherein the user device input errors are corrected; and
sending the corrected user device input to the web content server.

8. A system for manipulating information retrieved from a content server on a computer network, said system comprising:
means for connecting an intermediary machine between a user device and a web content server;
means for receiving information from the web content server at the intermediary machine, said intermediary machine having access to a plurality of transcoders and a directive script database;
means for transcoding in the intermediary machine the received information from the web content server into a transcoded response by at least one of the plurality of transcoders according to at least one directive script from the directive script database, wherein said at least one directive script selectively defines at least one transcoding property of at least one transcoder within the plurality of transcoders;
means for directing, according to the at least one directive script, which of said at least one transcoder are to be run;
means for directing, according to the at least one directive script, what order said at least one transcoder are to be run; and
means for sending the transcoded response to the user device.

9. The system of claim 8, wherein said at least one directive script is in eXtensible Markup Language format.

10. The system of claim 8, said at least one directive script having at least one embedded transcoding application.

11. The system of claim 8, further comprising:
means for sending at least one web page to the user device;
means for inputting into said at least one web page a user input from the user device, said user input selecting at least one preference setting; and
means for constructing said at least one directive script from said at least one preference setting.

12. The system of claim 11, wherein said at least one web page is sent from the intermediary machine.

13. The system of claim 8, wherein said computer network is an Internet.

14. The system of claim 8, further comprising:
means for receiving at the intermediary machine a user device input from the user device;
means for identifying any user device input errors received by the intermediary machine;
means for transcoding the user device input into a transcoded user device input in the intermediary machine by at said at least one of the plurality of transcoders according to said at least one directive script from the directive script database, wherein the user device input errors are corrected; and
means for sending the corrected user device input to the web content server.

15. A computer program product for manipulating information retrieved from a content server on a computer network, said computer program product comprising:
computer program code for connecting an intermediary machine between a user device and a web content server;
computer program code for receiving information from the web content server at the intermediary machine, said intermediary machine having access to a plurality of transcoders and a directive script database;
computer program code for transcoding in the intermediary machine the received information from the web content server into a transcoded response by at least one of the plurality of transcoders according to at least one directive script from the directive script database, wherein said at least one directive script selectively defines at least one transcoding property of at least one transcoder within the plurality of transcoders;
computer program code for directing, according to the at least one directive script, which of said at least one transcoder are to be run;
computer program code for directing, according to the at least one directive script, what order said at least one transcoder are to be run; and
computer program code for sending the transcoded response to the user device.

16. The computer program product of claim 15, wherein said at least one directive script is in eXtensible Markup Language format.

17. The computer program product of claim 15, said at least one directive script having program code for at least one embedded transcoding application.

18. The computer program product of claim 15, further comprising:
computer program code for sending at least one web page to the user device;
computer program code for inputting into said at least one web page a user input from the user device, said user input selecting at least one preference setting; and
computer program code for constructing said at least one directive script from said at least one preference setting.

19. The computer program product of claim 15, further comprising computer program code for sending said at least one web page from the intermediary machine.

20. The computer program product of claim 15, wherein said computer network is an Internet.

21. The computer program product of claim 15, further comprising:
computer program code for receiving at the intermediary machine a user device input from the user device;
computer program code for identifying any user device input errors received by the intermediary machine;
computer program code for transcoding the user device input into a transcoded user device input in the intermediary machine by said at least one of the plurality of transcoders according to said at least one directive script from the directive script database, wherein the user device input errors are corrected; and
computer program code for sending the corrected user device input to the web content server.

* * * * *